I *United States Patent*

Francois et al.

(10) Patent No.: US 9,426,464 B2
(45) Date of Patent: Aug. 23, 2016

(54) METHOD FOR CODING AND DECODING A BLOCK OF PIXELS FROM A MOTION MODEL

(71) Applicant: THOMSON LICENSING, Issy de Moulineaux (FR)

(72) Inventors: Edouard Francois, Bourg des Comptes (FR); Dominique Thoreau, Cesson Sevigne (FR); Jerome Vieron, Paris (FR); Philippe Bordes, Cesson Sevigne (FR)

(73) Assignee: THOMSON LICENSING, Princeton, NJ (US)

( * ) Notice: Subject to any disclaimer, the term of this patent is extended or adjusted under 35 U.S.C. 154(b) by 186 days.

(21) Appl. No.: 13/934,393

(22) Filed: Jul. 3, 2013

(65) Prior Publication Data

US 2014/0010306 A1 Jan. 9, 2014

(30) Foreign Application Priority Data

Jul. 4, 2012 (FR) ...................................... 12 56391

(51) Int. Cl.
*H04N 19/105* (2014.01)
*H04N 19/513* (2014.01)
(Continued)

(52) U.S. Cl.
CPC ....... *H04N 19/00684* (2013.01); *H04N 19/105* (2014.11); *H04N 19/11* (2014.11);
(Continued)

(58) Field of Classification Search
CPC ... H04N 19/105; H04N 19/513; H04N 19/11; H04N 19/00684; H04N 19/147; H04N 19/176; H04N 19/46

USPC ......................................... 375/240.13, 240.16
See application file for complete search history.

(56) References Cited

U.S. PATENT DOCUMENTS 6,636,565 B1 * 10/2003 Kim .......................... 375/240.27
6,735,249 B1 * 5/2004 Karczewicz et al. .......... 375/240
(Continued)

FOREIGN PATENT DOCUMENTS

| EP | EP0765087 | 3/1997 |
| WO | WO0111891 | 2/2001 |
| WO | WO0154418 | 7/2001 |

OTHER PUBLICATIONS

Hirohisa Jozawa etal: "Two-Stage motion compensation Using Adaptive Global MC and Local Affine MC", IEEE transactions on circuits and sysems for video technology, IEEE service center, Piscataway, NJ, US, vol. 7, No. 1, Feb. 1, 1997, pp. 75-85, ISSN: 1051-8215, DOI.

(Continued)

*Primary Examiner* — Christopher S Kelley
*Assistant Examiner* — Kathleen Walsh
(74) *Attorney, Agent, or Firm* — Tutunjian and Bitteo, P.C.

(57) ABSTRACT

A method for coding a current block using a parametric motion model whose parameters are defined from the motion data of the causal neighborhood is disclosed. Specifically, the method for coding the current block comprises the following steps:
determine a prediction block of the current block from a motion model defined by a set of parameters, the model associating a motion vector pointing at a pixel of a prediction block with each pixel of the current block.
calculate a residual block between the current block and the prediction block, and
code the residual block.
According to the invention, the parameters of the motion model are determined from the motion data associated with the causal neighborhood blocks of the current block. Therefore, they can be deducted from parts of images already coded and do not need to be incorporated in the image data stream.

20 Claims, 3 Drawing Sheets

(51) Int. Cl.
*H04N 19/51* (2014.01)
*H04N 19/176* (2014.01)
*H04N 19/147* (2014.01)
*H04N 19/46* (2014.01)
*H04N 19/11* (2014.01)

(52) U.S. Cl.
CPC .......... *H04N 19/147* (2014.11); *H04N 19/176* (2014.01); *H04N 19/46* (2014.11); *H04N 19/513* (2014.11); *H04N 19/51* (2014.11)

(56) References Cited

U.S. PATENT DOCUMENTS

| | | | | |
|---|---|---|---|---|
| 8,144,782 | B2* | 3/2012 | Lee et al. | 375/240.16 |
| 8,311,120 | B2* | 11/2012 | Kaushik | 375/240.23 |
| 8,811,495 | B1* | 8/2014 | Wen | 375/240.25 |
| 9,008,178 | B2* | 4/2015 | Thoreau et al. | 375/240.12 |
| 2005/0031037 | A1* | 2/2005 | Carrasco et al. | 375/240.16 |
| 2005/0213664 | A1* | 9/2005 | Mahkonen et al. | 375/240.17 |
| 2006/0227867 | A1* | 10/2006 | Winger et al. | 375/240.03 |
| 2007/0237224 | A1* | 10/2007 | Krishnan | 375/240.12 |
| 2008/0152000 | A1* | 6/2008 | Kaushik | 375/240.03 |
| 2008/0159393 | A1 | 7/2008 | Lee et al. | |
| 2008/0240246 | A1* | 10/2008 | Lee et al. | 375/240.16 |
| 2008/0240247 | A1 | 10/2008 | Lee et al. | |
| 2010/0177826 | A1 | 7/2010 | Bhaumik et al. | |
| 2011/0080954 | A1* | 4/2011 | Bossen et al. | 375/240.16 |
| 2011/0280309 | A1* | 11/2011 | Francois et al. | 375/240.16 |
| 2012/0195377 | A1* | 8/2012 | Auyeung et al. | 375/240.12 |

OTHER PUBLICATIONS

Labit C etal: "compact motion representation based on global features for semanticimage sequence coding", visual communication and image processing 1991: Visualcommunication, Nov. 11-13, 1991, Boston, Bellingham, WA, US, vol. 1605, Jan. 1, 1991, pp. 697-708.
Guillaume Laroche etal: "RD Optimized Coding for Motion Vector Predictor Selection", IEEE transactions on circuits and systems for video technology, IEEE service center, Piscataway, NJ, US, vol. 17, No. 12, Dec. 1, 2008, pp. 1681-1691, ISSN: 1051-8215.
Lai-Man Po etal: "Block-Matching translation and zoom motion compensated prediction", 90. MPEG meeting, Oct. 26-30, 2009; XIAN; (motion picture expert group or ISO/IEC JTC1/SC29/WG11), No. M16891, Oct. 23, 2009.
Wiegand T etal: "block-based hybrid video coding using motion-compensated long-term memory prediction", ITG fachberichte, VDE Verlag, Berlin, DE, No. 143, Jan. 1, 1997, pp. 153-158, ISSN: 0932-6022.
French Search Report dated Nov. 27, 2012.
Tuncel et al., "Utilization of the recursive shortest spanning tree algorithm for video-object segmentation by 2-D affine motion modeling", IEEE transactions on circuits and systems for video technology, vol. 10, No. 5, Aug. 2000, pp. 776-781.
Li et al., "An efficient underwater video compression algorithm for underwater acoustic channel transmission", 2009 International Conference on Communications and Mobile Computing, Yunnan, China, Jan. 6, 2009, pp. 211-215.
Seo et al., "Improved motion compensation using neighboring pixels and motion vector refinement", Optical Engineering, vol. 50, No. 1, Jan. 2011, pp. 1-6.
He et al., "Global bi-directional motion compensation frame interpolation algorithm" Multimedia Tools and Applications, vol. 52, Mar. 2011, pp. 19-31.
Wong et al., "Block-Matching Translation and Zoom Motion-Compensated Prediction by Sub-Sampling", 2009 16th IEEE International Conference on Image Processing (ICIP), Cairo, Egypt, Nov. 7, 2009, pp. 1597-1600.
Richter et al., "Real Time Global Motion Estimation for an MPEG-4 Video Encoder", Picture Coding Symposium, Apr. 25, 2001, pp. 1-4.
Smolic et al., "Long-Term Global Motion Estimation and Its Application for Sprite Coding, Content Description, and Segmentation", IEEE Transactions on Circuits and Systems for Video Technology, Dec. 1999, vol. 9, No. 8, pp. 1227-1242.
Smolic et al., "Long-term Global Motion Compensation for Advanced Video Coding", Visual Communications and Image Processing 2004, San Jose, California, USA, Jan. 3, 2004, pp. 1-4.
Steinback et al., "Using Multiple Global Motion Models for Improved Block-Based Video Coding", Proceedings of the 1999 International Conference on Image Processing (ICIP 1999), vol. 2, Oct. 1999, pp. 56-60.
Zhan et al., "Robust Split-and-Merge Text Segmentation Approach for Images", International Conference on Pattern Recognition 2006, Hong Kong, Aug. 2006, vol. 2, pp. 1-4.
Sun et al., "Global Motion Vector Coding (GMVC)", Joint Video Team (JVT) of ISO/IEC MPEG & ITU-T VCEG (ISO/IEC JTC1/SC29/WG11 and ITU-T SG16 Q.6), 2nd Meeting: Geneva, Switzerland, Jan. 29, 2002, pp. 1-13.
ITU-T Recommendation H.264, "Advanced video coding for generic audiovisual services", Series H: Audiovisual and Multimedia Systems, Infrastructure of Audiovisual services—Coding of Moving Video, May 2003, pp. 1-282.
International Standard ISO/IEC 13818-2, "Information technology—Generic coding of Moving Pictures and Associated Audio Information: Video", May 15, 1996, pp. 1-212.

* cited by examiner

METHOD FOR CODING AND DECODING A BLOCK OF PIXELS FROM A MOTION MODEL

This application claims the benefit, under 35 U.S.C. §119 of French Patent Application 1256391, filed Jul. 4, 2012.

TECHNICAL FIELD

This invention relates to coding and decoding video images. It relates specifically to a method for video coding and a method for video decoding of a block of image based on a prediction by motion compensation. The invention notably finds an application in the video compression field.

PRIOR ART

For coding a block of pixels, known as current block, of a current image, it is known to determine a prediction block of this current block from a motion model defined by a set of parameters, calculate a residual block between the current block and the prediction block thus determined, and to code said residual block.

The standards such as MPEG-2 or MPEG-4 AVC notably describe a translational motion model, associating a motion vector with each block or macro-block. The coding of motion vectors is carried out differentially, for example by prediction from vectors of the neighbouring blocks of the block to be coded. In the document entitled "Global Motion Vector Coding (GMVC)", by Shijun Sun, Shawmin Lei, VCEG-O21, ITU-T Video Coding Experts Group (VCEG) Meeting, Pattaya, Thailand, 4-7 Dec. 2001, the differential coding of motion vectors is carried out by prediction from a global motion model.

In the standard MPEG-4 part 2, a more or less elaborated motion model is defined for each area of the image to be coded. In the document entitled "Block-Matching Translation and Zoom Motion Compensated Prediction" by Lai-Man Po, Ka-Man Wong, Ka-Ho Ng, Kwok-Wai Cheung, Yu Liu, Ka-Man Cheng, Yan Huo, ISO/IEC JTC1/SC29/WG11 MPEG2009/M16891, 90th MPEG meeting, October 2009, Xian, Chine, the parameters of the motion model vary from one block to another.

In all cases, irrespective of the sophistication level of the motion model used, the parameters defining the motion model are coded and incorporated into the data stream. To limit the quantity of the motion parameters to be transmitted and reduce the extra cost linked to their transmission, the known methods apply the following principles:
- the parameters of the motion model are generally coded differentially from a block to another,
- the motion model is generally not too sophisticated to limit the quantity of parameters to be transmitted; it is limited to a translational model or a model with a very simple zoom,
- If a motion model is defined by area or by macro-block, the number of areas or macro-blocks is limited.

SUMMARY OF THE INVENTION

The purpose of the invention is to overcome all or some of the disadvantages of the prior art.

According to the invention, a method for coding is proposed using a parametric motion model of which the parameters of the model are defined from the motion data of the block of pixels of the causal neighbourhood.

Thus, the parameters of the motion model can be deduced from the parts of the image already coded. These parameters no longer need to be incorporated in the image data stream.

The object of the invention is a method for coding a block of pixels of an image, called current block, comprising the following steps:
- determine a prediction block of the current block from a motion model defined by a set of parameters, said motion model associating a motion vector pointing at a pixel of the prediction block with each pixel of the current block.
- calculate a residual block between said current block and said prediction block, and
- code said residual block.

According to the invention, the parameters of the motion model are determined from the motion data associated with blocks of pixels in the causal neighbourhood of said current block.

The causal neighbourhood is a well known term to those skilled in the art which designates blocks already coded (in the case of a coder) or already decoded (in the case of a decoder) which are neighbours of the current block to be coded or decoded.

According to the invention, the parameters of the motion model of the current block are deduced from the motion data resulting from the neighbouring blocks already coded and thus do not need to be Introduced into the data stream of the image. Theses parameters of the motion model will be determined by the decoder in the same way as the coder prior to decoding data of the current block. Hence, there is a reduction of data to be transmitted in the data stream of the image.

The coding mode thus defined is competing with other coding modes, notably with INTER coding. The motion data of the blocks of pixels of the causal neighbourhood are, for the blocks of the causal neighbourhood previously coded in INTER mode, the motion vectors associated with these blocks and, for the blocks of the causal neighbourhood previously coded as the current block, the motion vectors associated with the pixels of these blocks.

According to an embodiment of the invention, the motion model, noted θ, associates a motion vector v (x, y) with each pixel of coordinates (x, y) of the current block belonging to the following group:

$$-v(x, y) = \begin{pmatrix} a_0 + \alpha \cdot x \\ b_0 + \alpha \cdot y \end{pmatrix}$$

where ($a_0$, $b_0$, $\alpha$) are the model parameters, $$-v(x, y) = \begin{pmatrix} a_0 + a_1 \cdot x + a_2 \cdot y \\ b_0 + b_1 \cdot x + b_2 \cdot y \end{pmatrix}$$

where ($a_0$, $a_1$, $a_2$, $b_0$, $b_1$, $b_2$) are the model parameters, $$-v(x, y) = \begin{pmatrix} \frac{a_0 + a_1 \cdot x + a_2 \cdot y}{c_0 + c_1 \cdot x + c_2 \cdot y} \\ \frac{b_0 + b_1 \cdot x + b_2 \cdot y}{c_0 + c_1 \cdot x + c_2 \cdot y} \end{pmatrix} + \begin{pmatrix} x \\ y \end{pmatrix}$$

where ($a_0$, $a_1$, $a_2$, $b_0$, $b_1$, $b_2$, $c_0$, $c_1$, $c_2$) are the model parameters.

According to the invention, as the parameters of the motion model are not to be transmitted, the motion model used can be as sophisticated as we want. It is not limited by the number of parameters of the motion model.

The proposed motion models are advantageously more elaborate models than the translational standard models.

According to a particular embodiment, the motion data associated with the blocks of the causal neighbourhood are motion vectors associated with blocks or blocks of pixels and the parameters of the model are determined by minimisation to the least squares of the sum of the differences between each of the motion vectors of the blocks of the causal neighbourhood and the corresponding motion vector from the motion model. According to a variant, a motion vector is also associated with the current block. In this case, the parameters of the motion model of the current block are determined from the motion data associated with the blocks of pixels of the causal neighbourhood of said current block and said motion vector associated with the current block. In this case, the motion vector of the current block is transmitted in the data stream of the image. In this case, the sum of the differences for the minimisation to the least squares comprises the difference between the motion vector associated with the current block and the corresponding motion vector resulting from the motion model.

The causal neighbourhood of current block typically comprises blocks of pixels situated above and/or on the left of the current block. According to a particular embodiment, the causal neighbourhood of the current block comprises a first set of blocks of the same horizontal coordinate (x) in the current image as the current block and a second set of blocks of the same vertical coordinate (y) in the current image as the current block. The definition of such causal neighbourhood has the advantage of simplifying the calculation of the parameters of the motion model.

In the case of such a causal neighbourhood, minimising to the least squares is first applied on the first set of blocks then the second set of blocks then on the entire causal neighbourhood to determine the parameters of the motion model.

According to another embodiment, the causal neighbourhood of the current block is segmented in a plurality of sets of blocks and a set of parameters is determined for each one of sets of blocks for the considered motion model. After segmenting, a prediction block of the current block is determined with each one of sets of parameters associated with all sets of blocks, a residual block between the current block and each one of prediction blocks is calculated and each one of the residual blocks is coded. Among the coded residual blocks, the one that responds to a predefined criterion is transmitted. Advantageously, the selection criterion of the coded residual block to be transmitted is a bitrate-distortion criterion. An item of information identifying the set of parameters having served to determine the prediction block associated with the transmitted residual block is also transmitted with the coded residual block.

The purpose of the invention is also to provide a device which could implement the method for coding defined above and more specifically a device for coding a block of pixels of an image, called current block, comprising:
  calculation means to determine a prediction block of the current block from a motion model defined by a set of parameters and calculate a residual block between said current block and said prediction block, said motion model associating a motion vector pointing at a pixel of the prediction block with each pixel of the current block, and
  coding means to code said residual block.

According to the invention, the calculation means are able to determine, for said current block, the parameters of the motion model from the motion data associated with blocks in the causal neighbourhood of said current block.

The invention also relates to a method for decoding a block of pixels of an image, called current block from an associated coded residual block, comprising the following steps:
  decode said coded residual block;
  determine a prediction block of the current block from a motion model defined by a set of parameters, said motion model associating a motion vector pointing at a pixel of the prediction block with each pixel of the current block, and
  determine the current block from said decoded residual block and said prediction block.

According to the invention, for said current block, the parameters of the motion model are determined from the motion data associated with blocks in the causal neighbourhood of said current block.

Finally, the invention also relates to a device for decoding a block of pixels of an image, called current block, from an associated residual block, comprising:
  decoding means to decode said residual block,
  calculation means to determine a prediction block of the current block from a motion model defined by a set of parameters, and determine the current block from the residual decoded block and said prediction block, said motion model associating a motion vector pointing at a pixel of the prediction block with each pixel of the current block.

According to the invention, the calculation means are able to determine the parameters of motion model from the motion data associated with blocks in the causal neighbourhood of said current block.

Experts in the field may note other advantages when studying the following examples, illustrated in the figures appended, provided by way of example.

DETAILED DESCRIPTION OF AT LEAST ONE EMBODIMENT

Figure 1:
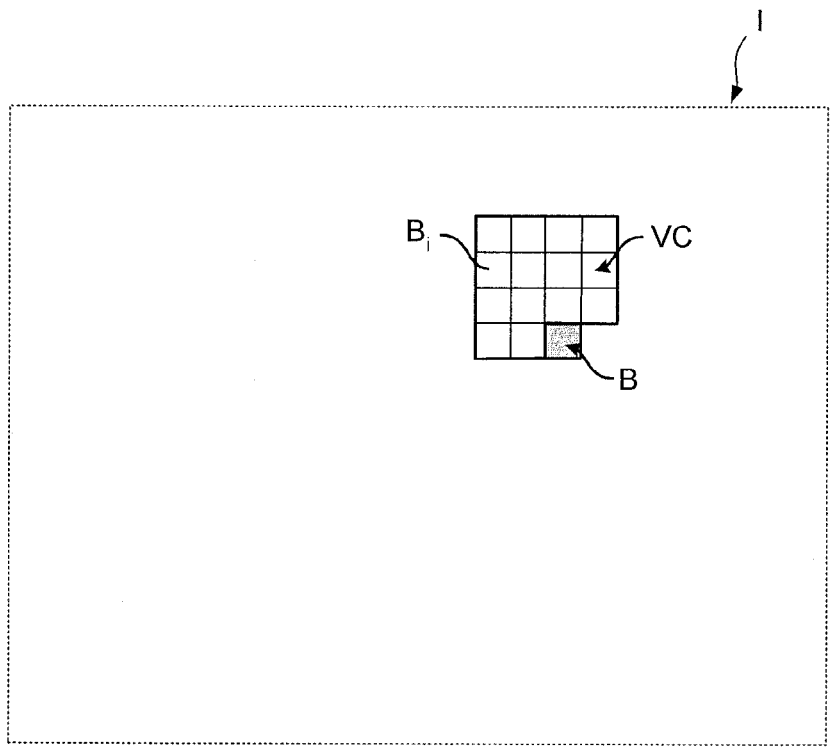
FIG. 1 diagrammatically shows a first example of the causal neighbourhood for implementing the invention.

According to the invention, a method for coding a block of pixels using a parametric motion model is defined. The set of parameters of the parametric motion model is determined from motion data of blocks of pixels in the causal neighbourhood of the considered block of pixels. Block of pixels is understood to be every set of adjacent pixels of sizes 4×4, 8×8, 16×16, 8×16, 16×8 . . . but also every other set of adjacent pixels of different sizes such as for example a macroblock, an area or an image slice.

The motion model associated with a block of pixels define a motion vector for each pixel. In the case of the motion compensation with determination of a prediction block, the motion vector defined by a pixel of a block of current pixels points at a pixel of the prediction block.

According to the invention, the motion model is a parametric model not necessarily translational of which the parameters are defined locally.

The use of a model enables a richer motion representation than a translational model and being able to vary locally. The parameters may vary locally, for example between neighbouring blocks. A motion compensation of a very good precision is obtained, hence a temporal motion based prediction of a very good quality, enabling thus a coding cost reduction of the residues of temporal prediction.

According to the invention, a particular coding mode called LPM is defined in the remainder of the description for (Locally derived Parametric Motion), relying on a parametric motion model $\theta$. When the LPM mode is invoked by a current block to be coded, the motion associated with the pixels of the current block is defined based on a set of local parameters and the pixel position in the block (or in the image).

The motion model $\theta$ associates a motion vector $v(x, y)$ with each coordinate pixel $(x, y)$ of the current block, having one of the following forms $$v(x, y) = \begin{pmatrix} a_0 + \alpha \cdot x \\ b_0 + \alpha \cdot y \end{pmatrix} \quad 1)$$

where $(a_0, b_0, \alpha)$ are the model parameters;

$$v(x, y) = \begin{pmatrix} a_0 + a_1 \cdot x + a_2 \cdot y \\ b_0 + b_1 \cdot x + b_2 \cdot y \end{pmatrix} \quad 2)$$

where $(a_0, a_1, a_2, b_0, b_1, b_2)$ are the model parameters;

$$v(x, y) = \begin{pmatrix} \frac{a_0 + a_1 \cdot x + a_2 \cdot y}{c_0 + c_1 \cdot x + c_2 \cdot y} \\ \frac{b_0 + b_1 \cdot x + b_2 \cdot y}{c_0 + c_1 \cdot x + c_2 \cdot y} \end{pmatrix} + \begin{pmatrix} x \\ y \end{pmatrix} \quad 3)$$

where $(a_0, a_1, a_2, b_0, b_1, b_2, c_0, c_1, c_2)$ are the model parameters.

Case 1) corresponds to a zoom motion. Case 2) shows an affine motion and case 3) shows a perspective motion.

One of these models is chosen at the start of each image or each image slice. Each time the model changes, a representative information is introduced in the data stream to warn the decoder. Also, only one model can be used for all the video sequence. As it is restricted to a neighbourhood of limited size, the affine model (case 2) seems the most appropriate for representing a 2D motion. It constitutes in fact a good compromise in terms of complexity, robustness of parameter estimation. In the remainder of the description, this model is used.

The LPM mode is a competitor with other coding modes and notably with the INTER coding mode. In particular, the INTER coding mode relying on a translational motion vector remains possible.

To determine the parameters of the motion model $\theta$, a method of the least squares called complete least squares for example is applied.

For this parameters calculation, it is assumed that, in the causal neighbourhood VC of the block to code, motion data reconstructed during the previous coding of the blocks of this neighbourhood is available. This causal neighbourhood comprises N adjacent blocks $B_i$, $i=1, \ldots, N$, of position $p_i=(x_i, y_i)$, corresponding for example to the central position of the block in the image, for which a motion vector $v_i=(dx_i, dy_i)$ is available. This causal neighbourhood is for example as is shown on FIG. 1. In this example, the causal neighbourhood comprises N=14 blocks $B_i$ already coded and located on the left and or above the block B to be coded.

The parameters $(a_0, a_1, a_2, b_0, b_1, b_2)$ of the affine model from values $v_i$ and $p_i$ are calculated, for $i=1 \ldots N$.

According to the method of the complete least squares, the motion model $\theta$ parameters are determined by minimisation to the least squares as follows:

$$\hat{\theta} = E(\theta) = \arg\min_\theta \sum_{i=1}^{N} w_i \left( \frac{(dx_i - a_0 - a_1 \cdot x_i - a_2 \cdot y_i)^2}{} + \frac{(dy_i - b_0 - b_1 \cdot x_i - b_2 \cdot y_i)^2}{} \right) \quad (1)$$

The parameter $w_i$ is a weighting factor which is a function of the coding mode of the block $B_i$. For example, if the block $B_i$ has been coded in INTRA mode, the coefficient $w_i$ is equal to 0 and, if it has been coded in INTER mode or LPM mode, its weighting coefficient is equal to 1.

The weighting coefficient $w_i$ can also be function of the position $(x_i, y_i)$ of the block $B_i$ with respect to the position of the current block to be coded.

If the block $B_i$ has been coded in INTER mode, the motion vector $v_i=(dx_i, dy_i)$ of the block $B_i$ is the motion vector which served at the "block matching" operation for this coding.

If the block $B_i$ has been coded in LPM mode and if this block comprises Q pixels, the expression $(dx_i-a_0-a_1\cdot x_i-a_2\cdot y_i)^2+(dy_i-b_0-b_1\cdot x_i-b_2\cdot y_i)^2$ associated with block Bi is replaced by the expression $$\sum_{j=1}^{Q} ((dx_j - a_0 - a_1 \cdot x_j - a_2 \cdot y_j)^2 + (dy_j - b_0 - b_1 \cdot x_j - b_2 \cdot y_i)^2)$$

in which $(x_j, y_j)$ are the coordinates of the position of the pixel j and $(dx_j, dy_j)=v_j$ is the motion vector of pixel j defined for the LPM coding of the block B.

As a variant, if a mode is called LPM_MV described later is used to code block $B_i$, the motion vector $v_i$ of the block $B_i$ is the motion vector defined for this mode.

As the expression (1) to be minimized is linear based on $\theta$, this minimisation returns to resolve a linear system. The resolution of such system is well known.

The resolution of this system enables to determine the set of parameters $(a_0, a_1, a_2, b_0, b_1, b_2)$ of the affine model (case 2) for the current block. This resolution is carried out by the coder for coding the current block and by the decoder for the current block. The coder (respectively the decoder) uses only motion data of blocks already coded (respectively decoded) of the causal neighbourhood to determine the parameters $(a_0, a_1, a_2, b_0, b_1, b_2)$.

Figure 2:
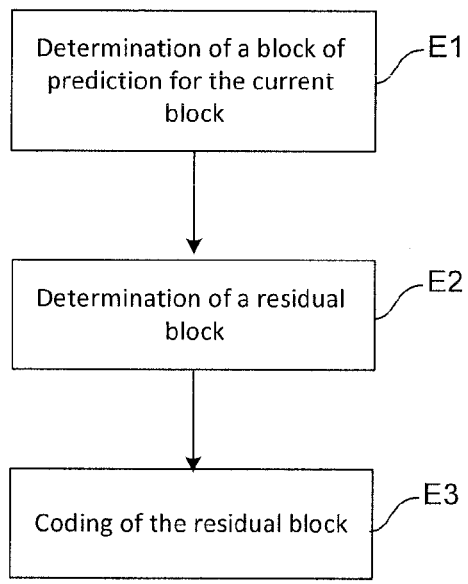
FIG. 2 shows a flowchart of the steps of the coding method of the invention, FIG. 3 diagrammatically shows a second example of the causal neighbourhood for the implementation of the invention.

Once the set of parameters is defined, a prediction block can then be determined for the current block to be coded from the motion model using parameters $(a_0, a_1, a_2, b_0, b_1, b_2)$ defined for the current block. These parameters are local as determined from a local causal neighbourhood and are specific to the current block to be coded as determined from a causal neighbourhood which is specific to the current block. This step for determining the prediction block is then followed by a step for calculating the residual block between the current block and the prediction block and by a step for coding the residual block. These 3 main steps of the method for coding are shown on FIG. 2. On this figure, the step for determining the prediction block is referenced E1, the step for calculating the residual block is referenced E2 and the step for coding the residual block is referenced E3.

According to method of the least squares previously defined, the determination of the parameters of the motion model is carried out by resolving a linear system.

Figure 3:
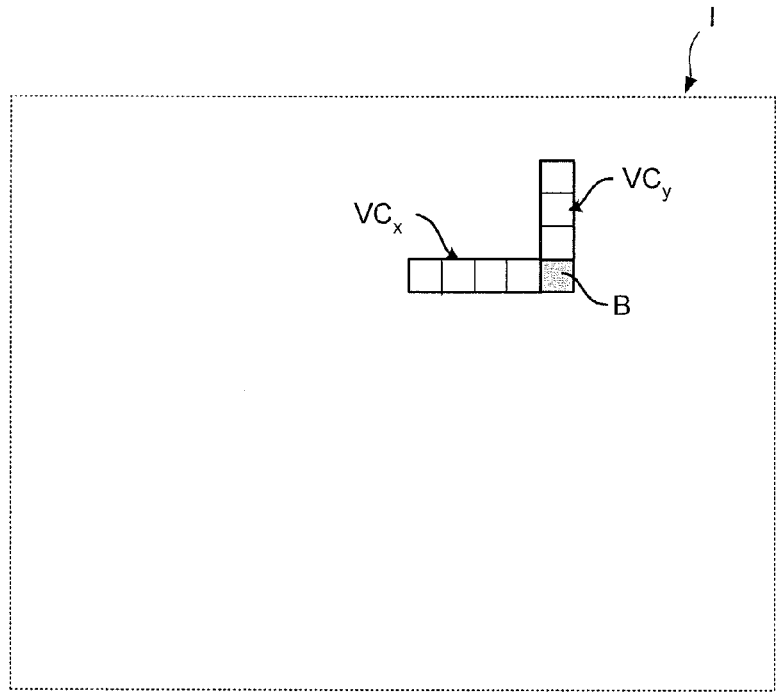

According to another method, called hereafter method of the simplified least squares, the causal neighbourhood is reduced to a set $V_x$ of blocks of the same vertical coordinate in the current image that the current block and a set $V_y$ of blocks of the same horizontal coordinates in the current image as the current block. FIG. 3 shows such a causal neighbourhood. In this example, $V_x$ comprises 4 neighbouring blocks $B_i$ situated on the left of the block B to be coded and $V_y$ comprises the 3 neighbouring blocks $B_i$ situated on top of the block B to be coded. Such causal neighbourhood enables to simplify the determination of the set of parameters of the motion model.

The determination of the set of parameters is carried out in 3 sub-steps:
 a minimisation to the least squares is applied on set $V_x$; blocks of $V_x$ have the same vertical coordinate $y_i$ as the current block to be coded; only the horizontal coordinate $x_i$ varies, which enables to estimate the affine part in x of $\theta$, that is to say parameters $a_1$ and $b_1$; this can be done by minimising $E(\theta)$ with respect to $a_1$ and $b_1$;
 a minimisation to the least squares is then applied on set $V_y$; blocks of $V_y$ have the same horizontal coordinate $x_i$ as the current block to be coded; only the vertical coordinate $y_i$ varies, which enables to estimate the affine part in y of $\theta$, that is to say parameters $a_2$ and $b_2$; this can be done by minimising $E(\theta)$ with respect to $a_2$s and $b_2$;
 finally, minimisation to the least squares is applied on all the causal neighbourhood; knowing $a_1$, $a_2$, $b_1$, $b_2$, oe can calculated $a_0$ and $b_0$; that is to say minimisation of $E(\theta)$ with respect to $a_0$ and $b_0$.

In the preceding description, a single set of parameters is calculated to determine the prediction block of the current block. According to an embodiment in variant, the causal neighbourhood of the current block is segmented in a plurality of sets of blocks and a set of parameters is calculated for each set of blocks for the considered motion model. Indeed, the causal neighbourhood can potentially comprise several areas having distinct motions. It would therefore be of interest to define a set of parameters for each one of these areas.

The causal neighbourhood is thus segmented in several areas or sets of adjacent blocks according to a standard method, for example by a regional growth method using a RSST (Recursive Shortest Spanning Tree) algorithm as defined in the document entitled "Utilization of the recursive shortest spanning tree algorithm for video-object segmentation by 2-D affine motion modelling" by E. Tuncel, L. Onural, TCSVT, Vol 10, Issued on Aug. 5, 2000, Pages: 776-781 or an algorithm of type "split and merge" as defined in the document entitled "A Robust Split-and-Merge Text Segmentation Approach for Images" by Yaowen Zhan, Weiqiang Wang, Wen Gao, ICPR'06, Volume 2, Hong Kong, August 2006. According to this method, the causal neighbourhood is cut out according to a predefined structure then two by two of the neighbouring areas are sought to be regrouped together.

After segmenting, a set of parameters is calculated for each set of blocks (or segments of blocks) according to the method of the complete least squares. This step is carried out by the coder and can be conducted symmetrically by the decoder. One or several sets of parameters are thus available for the motion model.

If more than one set of parameters is available, the residual block is calculated and coded (steps E1 to E3) using each one set of parameters for the motion model. Among the coded residual blocks, the coded residual block which is optimal according to a predefined criterion is selected, preferably a bitrate-distortion type criterion. Moreover, an item of information is generated identifying the set of parameters having served to determine the prediction block associated with the selected residual block. This information is transmitted at the same time as the coded residual block also transmitted. This information is preferably the index, among the indexes of a list associating an index to each set of parameters, of the set of parameters having served to determine the prediction block associated with the transmitted residual block.

In reception, the decoder receives the coded residual block and the index of the set of parameters. It carries out the same operation for the segmentation and the same operation for the determination of the set of parameters as the coder. Then the decoder decodes said coded residual block and determines a prediction block of the current block from the motion model configured with the set of parameters associated with the received index. The decoder determines then the current block from the decoded residual block and said prediction block.

With regard to what has preceded, in LPM mode, no parameter of the motion model is transmitted to the decoder except the information identifying the set of parameters having served to determine the prediction block associated with the selected residual block.

As a variant, when the LPM mode is invoked for the current block, a motion vector is nevertheless coded for the current block transmitted with the residual block. In fact, the motion model obtained from the motion data of the causal neighbourhood blocks could be unsatisfactory for the current block (for example because it creates too much distortion). Therefore, according to a particular LPM mode, it is proposed to combine and transmit a motion vector for the current block for the motion model associated with the current block to be not only determined from the motion data of the causal neighbourhood but also from this motion vector associated with the current block. This motion vector associated with the current block can be determined in different ways, for example by a "block matching" operation.

Hence, two types of the LPM mode can be defined:
 an LPM_SKIP mode where no motion information is transmitted, the parameters of the motion model are exclusively deducted from the motion data of blocks already coded from the causal neighbourhood,
 an LPM_MV mode where a translational motion vector is coded and transmitted with the residual block, the parameters of the motion model are deducted from the motion data of blocks of the causal neighbourhood and of the current block.

The invention enables a more refined description of the motion which is based on a parametric model of which the parameters can vary locally. It thus enables a better temporal prediction without extra coding cost, which will finally enable enhancing the quality without increasing the bitrate.

Figure 4:
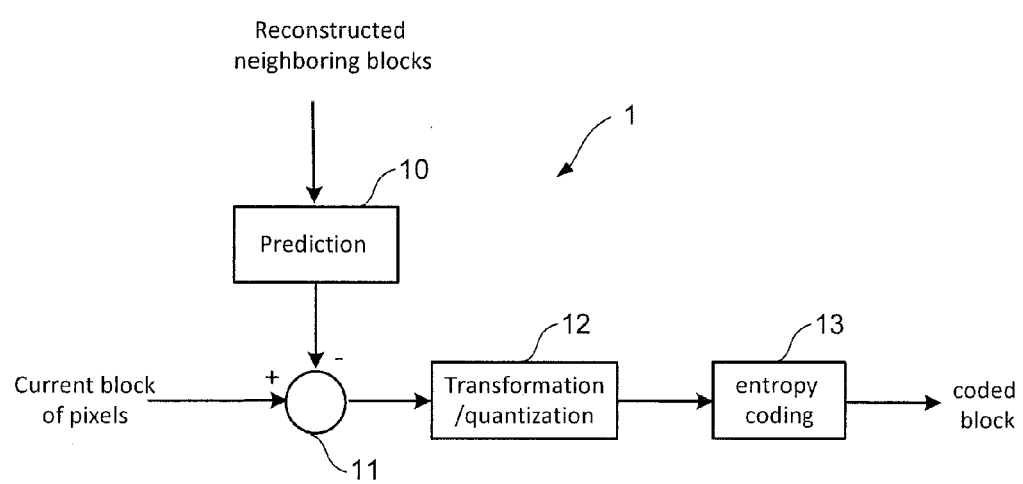
FIG. 4 shows a coder which could implement the method steps of FIG. 2.

The method for coding of the invention is for example implemented in a coding device as shown on FIG. 4. This coding device referenced 1, comprises a circuit 10 to determine a prediction block from a motion model of which the parameters are determined from motion data associated with blocks of pixels of the causal neighbourhood VC of the current block, a differential circuit 11 to generate a residual block from the prediction block and from the current block, a circuit 12 of transformation and/or quantization to generate a quantized residual block and a circuit 13 of an entropy coding to generate the coded current block.

Figure 5:
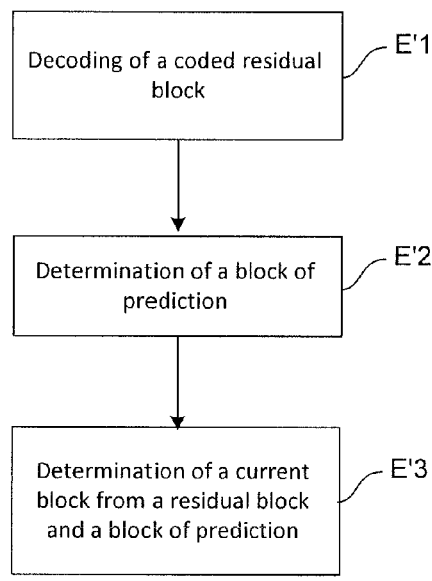
FIG. 5 shows a flowchart of the steps of the invention's method for decoding.

On the decoder side, the method comprises the following steps shown on FIG. 5:
- a step E'1 for decoding a coded residual block associated with a current block and received by the decoder,
- a step E'2 to determine a prediction block of the current block from a motion model of which the parameters are determined from the motion data associated with blocks already decoded from the causal neighbourhood VC of the current block, and
- a step E'3 to determine the current block from the decoded residual block and the prediction block.

Figure 6:
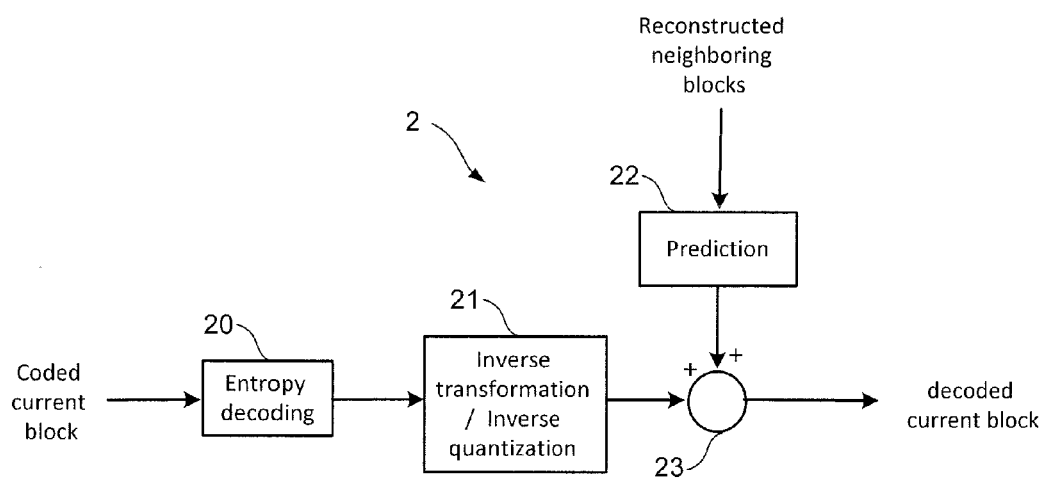
FIG. 6 shows a decoder which could implement the method steps of FIG. 5.

This method for decoding is for example implemented in a decoding device as shown on FIG. 6. This decoding device, referenced 2, comprises a circuit 20 for an entropy decoding, a circuit 21 for the inverse transformation and/or inverse quantization of the block of pixels resulting from the circuit of the entropy decoding, a circuit 22 to determine a prediction block from a motion model of which the parameters are determined from the motion data associated with the blocks of pixels of the causal neighbourhood VC of the current block, and a circuit 23 to add the blocks of pixels resulting from the prediction circuit 22 and from the circuit 21 for generating the decoded current block.

The devices for coding 1 and for decoding 2 according to the invention are for example implemented on a computer platform having hardware components such as one or several microprocessors or CPU, a random access memory or RAM, a non volatile memory or Read Only Memory ROM and one of the interfaces of input/output which are connected to each other by an address and data bus. The platform can also comprise a man-machine interface. The platform generally comprises an operating system and microcode. According to an implementation example, algorithms implementing the steps of the methods specific to the invention are stored in the memory ROM. When powered up, the microprocessor loads and runs the instructions of these algorithms.

According to variants, the coding and decoding devices compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

Although the invention has been described in relation to different particular embodiments, it is obvious that it is in no way restricted and that it comprises all the technical equivalents of the means described together with their combinations if the latter fall within the scope of the invention.

What is claimed is:

1. A method for coding a block of pixels of an image comprising:
   determining a prediction block of a current block from a motion model defined by a set of parameters, said motion model associating a motion vector pointing at a pixel of a prediction block with each pixel of the current block;
   calculating a residual block between said current block and said prediction block; coding said residual block; wherein, for said current block, the prediction block is determined and said residual block is calculated and coded according to the following:
   segmenting a causal neighborhood of the current block into a plurality of sets of blocks, a set of parameters being determined for each one of the plurality of sets of blocks, motion data associated with the plurality of sets of blocks of the causal neighborhood comprise motion vectors, wherein the set of parameters of the motion model are determined by minimization to a least squares of the sum of differences between each one of said motion vectors of the plurality of sets of blocks of the causal neighborhood and the associated motion vector resulting from the motion model;
   determining a prediction block of the current block with each one of said sets of parameters;
   calculate a residual block between the current block and each one prediction block and code said residual blocks; and
   selecting, among coded residual blocks, the coded residual block to transmit according to a predefined selection criterion and generate information identifying the set of parameters having served to determine the prediction block associated with the selected residual block, said information being transmitted with said coded residual block;
   wherein a first minimization to the least squares is applied on a first set of blocks then a second minimization to the least squares is applied on a second set of blocks then a third minimization is applied on the whole causal neighborhood to determine the parameters of the motion model.

2. The method according to claim 1, wherein the motion model, noted θ, associates a motion vector v(x,y) belonging to the following group with each pixel of coordinates (x,y) of current block:

$$-v(x, y) = \begin{pmatrix} a_0 + \alpha \cdot x \\ b_0 + \alpha \cdot y \end{pmatrix}$$

where ($a_0$, $b_0$, α) are the model parameters, $$-v(x, y) = \begin{pmatrix} a_0 + a_1 \cdot x + a_2 \cdot y \\ b_0 + b_1 \cdot x + b_2 \cdot y \end{pmatrix}$$

where ($a_0$, $a_1$, $a_2$, $b_0$, $b_1$, $b_2$) are the model parameters, $$-v(x, y) = \begin{pmatrix} \frac{a_0 + a_1 \cdot x + a_2 \cdot y}{c_0 + c_1 \cdot x + c_2 \cdot y} \\ \frac{b_0 + b_1 \cdot x + b_2 \cdot y}{c_0 + c_1 \cdot x + c_2 \cdot y} \end{pmatrix} + \begin{pmatrix} x \\ y \end{pmatrix}$$

where ($a_0$, $a_1$, $a_2$, $b_0$, $b_1$, $b_2$, $c_0$, $c_1$, $c_2$) are the model parameters.

3. The method according to claim 1, wherein a motion vector is associated with the current block and wherein, for said current block, the parameters of the motion model are determined from motion data associated with the blocks of pixels of the causal neighborhood of said current block and said motion vector associated with the current block.

4. The method according to claim 3, wherein said sum also comprises the difference between the motion vector associated with the current block and the corresponding motion vector resulting from the motion model.

5. The method according to claim 1, wherein the first set of blocks ($VC_x$) comprises blocks of the same vertical coordinate in the current image as the current block and the second set of blocks ($VC_y$) comprises blocks of the same horizontal coordinates in the current image as the current block.

6. A device for coding a block of pixels of an image comprising at least a processor configured to:
determine a prediction block of a current block from at least one motion model defined by a set of parameters, said motion model associating a motion vector pointing at a pixel of a prediction block with each pixel of the current block,
calculate a residual block between said current block and said prediction block, said motion model associating a motion vector pointing at a pixel of the prediction block with each pixel of the current block, and code said residual block;
wherein said processor is further configured to:
segment the causal neighborhood of the current block into a plurality of sets of blocks, a set of parameters being determined for each one of the sets of blocks motion data associated with the plurality of sets of blocks of the causal neighborhood comprise motion vectors, wherein the set of parameters of the motion model are determined by minimization to a least squares of the sum of differences between each one of said motion vectors of the plurality of sets of blocks of the causal neighborhood and the associated motion vector resulting from the motion model;
determine a prediction block of the current block with each one of said sets of parameters;
calculate a residual block between the current block and each one prediction block and code said residual blocks; and
select, among coded residual blocks, the coded residual block to transmit according to a predefined selection criterion and generate information identifying the set of parameters having served to determine the prediction block associated with the selected residual block, said information being transmitted with said coded residual block;
wherein a first minimization to the least squares is applied on the a set of blocks then a second minimization to the least squares is applied on a second set of blocks then a third minimization is applied on the whole causal neighborhood to determine the parameters of the motion model.

7. The device according to claim 6, wherein the motion model, noted θ, associates a motion vector v(x,y) belonging to the following group with each pixel of coordinates (x,y) of current block:

$$v(x, y) = \begin{pmatrix} a_0 + \alpha \cdot x \\ b_0 + \alpha \cdot y \end{pmatrix}$$

where ($a_0$, $b_0$, $\alpha$) are the model parameters, $$v(x, y) = \begin{pmatrix} a_0 + a_1 \cdot x + a_2 \cdot y \\ b_0 + b_1 \cdot x + b_2 \cdot y \end{pmatrix}$$

where ($a_0$, $a_1$, $a_2$, $b_0$, $b_1$, $b_2$) are the model parameters, $$v(x, y) = \begin{pmatrix} \frac{a_0 + a_1 \cdot x + a_2 \cdot y}{c_0 + c_1 \cdot x + c_2 \cdot y} \\ \frac{b_0 + b_1 \cdot x + b_2 \cdot y}{c_0 + c_1 \cdot x + c_2 \cdot y} \end{pmatrix} + \begin{pmatrix} x \\ y \end{pmatrix}$$

where ($a_0$, $a_1$, $a_2$, $b_0$, $b_1$, $b_2$, $c_0$, $c_1$, $c_2$) are the model parameters.

8. The device according to claim 6, wherein a motion vector is associated with the current block and wherein, for said current block, the parameters of the motion model are determined from motion data associated with the blocks of pixels of the causal neighborhood of said current block and said motion vector associated with the current block.

9. The device according to claim 8, wherein said sum also comprises the difference between the motion vector associated with the current block and the corresponding motion vector resulting from the motion model.

10. The device according to claim 6, wherein the first set of blocks ($VC_x$) comprises blocks of the same vertical coordinate in the current image as the current block and the second set of blocks ($VC_y$) comprises blocks of the same horizontal coordinates in the current image as the current block.

11. A method for decoding a block of pixels of an image from an associated coded residual block comprising:
decoding said coded residual block;
determining a prediction block of a current block from a motion model defined by a set of parameters, said motion model associating a motion vector pointing at a pixel of a prediction block with each pixel of the current block;
determining the current block from said decoded residual block and said prediction block, wherein, for said current block, said prediction block is determined by:
segmenting a causal neighborhood of the current block into a plurality of sets of blocks, a set of parameters being determined for each one of the plurality of sets of blocks, motion data associated with the plurality of sets of blocks of the causal neighborhood comprise motion vectors, wherein the set of parameters of the motion model are determined by minimization to a least squares of the sum of differences between each one of said motion vectors of the plurality of sets of blocks of the causal neighborhood and the associated motion vector resulting from the motion model;
decoding information identifying a set of parameters;
determining a prediction block of the current block from a motion model defined by said set of parameters identified by said decoded information;
wherein a first minimization to the least squares is applied on the first set of blocks then a second minimization to the least squares is applied on the second set of blocks then a third minimization is applied on the whole causal neighborhood to determine the parameters of the motion model.

12. The method according to claim 11, wherein the motion model, noted θ, associates a motion vector v(x,y) belonging to the following group with each pixel of coordinates (x,y) of current block:

$$v(x, y) = \begin{pmatrix} a_0 + \alpha \cdot x \\ b_0 + \alpha \cdot y \end{pmatrix}$$

where ($a_0$, $b_0$, $\alpha$) are the model parameters, $$v(x, y) = \begin{pmatrix} a_0 + a_1 \cdot x + a_2 \cdot y \\ b_0 + b_1 \cdot x + b_2 \cdot y \end{pmatrix}$$

where ($a_0$, $a_1$, $a_2$, $b_0$, $b_1$, $b_2$) are the model parameters, $$v(x, y) = \begin{pmatrix} \frac{a_0 + a_1 \cdot x + a_2 \cdot y}{c_0 + c_1 \cdot x + c_2 \cdot y} \\ \frac{b_0 + b_1 \cdot x + b_2 \cdot y}{c_0 + c_1 \cdot x + c_2 \cdot y} \end{pmatrix} + \begin{pmatrix} x \\ y \end{pmatrix}$$

where ($a_0$, $a_1$, $a_2$, $b_0$, $b_1$, $b_2$, $c_0$, $c_1$, $c_2$) are the model parameters.

13. The method according to claim 11, wherein a motion vector is associated with the current block and wherein, for said current block, the parameters of the motion model are determined from motion data associated with the blocks of pixels of the causal neighborhood of said current block and said motion vector associated with the current block.

14. The method according to claim 13, wherein said sum also comprises the difference between the motion vector associated with the current block and the corresponding motion vector resulting from the motion model.

15. The method according to claim 11, wherein the first set of blocks ($VC_x$) comprises blocks of the same vertical coordinate in the current image as the current block and the second set of blocks ($VC_y$) comprises blocks of the same horizontal coordinates in the current image as the current block.

16. A device for decoding a block of pixels of an image from an associated coded residual block comprising at least a processor configured to:
 decode the residual block;
 determine a prediction block of a current block from a motion model defined by a set of parameters; and
 determine the current block from the decoded residual block and said prediction block, said motion model associating a motion vector pointing at a pixel of the prediction block with each pixel of the current block, wherein the processor is further configured to:
  segment the causal neighborhood of the current block into a plurality of sets of blocks, a set of parameters being determined for each one of the sets of blocks, motion data associated with the plurality of sets of blocks of the causal neighborhood comprise motion vectors;
  decode information identifying a set of parameters, wherein the set of parameters of the motion model are determined by minimization to a least squares of the sum of differences between each one of said motion vectors of the plurality of sets of blocks of the causal neighborhood and the associated motion vector resulting from the motion model; and
  determine a prediction block of the current block from a motion model defined by said set of parameters identified by said decoded information;
 wherein a first minimization to the least squares is applied on the first set of blocks then a second minimization to the least squares is applied on the second set of blocks then a third minimization is applied on the whole causal neighborhood to determine the parameters of the motion model.

17. The device according to claim 16, wherein the motion model, noted θ, associates a motion vector v(x,y) belonging to the following group with each pixel of coordinates (x,y) of current block:

$$v(x, y) = \begin{pmatrix} a_0 + \alpha \cdot x \\ b_0 + \alpha \cdot y \end{pmatrix}$$

where ($a_0$, $b_0$, $\alpha$) are the model parameters, $$v(x, y) = \begin{pmatrix} a_0 + a_1 \cdot x + a_2 \cdot y \\ b_0 + b_1 \cdot x + b_2 \cdot y \end{pmatrix}$$

where ($a_0$, $a_1$, $a_2$, $b_0$, $b_1$, $b_2$) are the model parameters, $$v(x, y) = \begin{pmatrix} \frac{a_0 + a_1 \cdot x + a_2 \cdot y}{c_0 + c_1 \cdot x + c_2 \cdot y} \\ \frac{b_0 + b_1 \cdot x + b_2 \cdot y}{c_0 + c_1 \cdot x + c_2 \cdot y} \end{pmatrix} + \begin{pmatrix} x \\ y \end{pmatrix}$$

where ($a_0$, $a_1$, $a_2$, $b_0$, $b_1$, $b_2$, $c_0$, $c_1$, $c_2$) are the model parameters.

18. The device according to claim 16, wherein a motion vector is associated with the current block and wherein, for said current block, the parameters of the motion model are determined from motion data associated with the blocks of pixels of the causal neighborhood of said current block and said motion vector associated with the current block.

19. The device according to claim 18, wherein said sum also comprises the difference between the motion vector associated with the current block and the corresponding motion vector resulting from the motion model.

20. The device according to claim 16, wherein the first set of blocks ($VC_x$) comprises blocks of the same vertical coordinate in the current image as the current block and the second set of blocks ($VC_y$) comprises blocks of the same horizontal coordinates in the current image as the current block.

* * * * *